United States Patent [19]

Bigglestone

[11] 4,171,593
[45] Oct. 23, 1979

[54] POT INCLUDING WATER LEVEL INDICATOR

[75] Inventor: Edwin J. Bigglestone, Scarborough, Canada

[73] Assignee: Canaird Sales Ltd., Scarborough, Canada

[21] Appl. No.: 876,563

[22] Filed: Feb. 10, 1978

[51] Int. Cl.² .................... A01G 9/02; A01G 27/00
[52] U.S. Cl. .................................... 47/79; 47/80; 73/322; 73/322.5
[58] Field of Search .................... 47/79–81, 47/59; 73/322, 322.5, 319, 320, 317; 137/426, 429, 430, 433, 434, 432, 448

[56] References Cited

U.S. PATENT DOCUMENTS

| | | | |
|---|---|---|---|
| 124,207 | 3/1872 | Hess | 47/79 |
| 1,221,449 | 4/1917 | Hitchcock | 47/80 |
| 2,249,197 | 7/1941 | Brundin | 47/79 X |
| 2,834,211 | 5/1958 | Samartano | 73/322 |
| 3,361,156 | 1/1968 | Klingle, Sr. | 73/322.5 X |
| 3,552,058 | 1/1971 | Fici | 47/79 |
| 3,739,524 | 6/1973 | Rose | 47/81 |

FOREIGN PATENT DOCUMENTS

| | | | |
|---|---|---|---|
| 2360594 | 6/1975 | Fed. Rep. of Germany | 47/81 |
| 1395186 | 12/1965 | France | 47/81 |

*Primary Examiner*—Paul T. Sewell
*Assistant Examiner*—Steven A. Bratlie
*Attorney, Agent, or Firm*—Carl B. Fox, Jr.

[57] ABSTRACT

Pots for growing plants including water-level indicators therefor, wherein the pot includes an outer pot and an inner pot supported therein having a lower portion of reduced diameter through which water is conducted upwardly by surface tension activity, and wherein the water-level indicator comprises a float in the water reservoir having a stem extending upwardly through a water inlet to indicate the water level.

4 Claims, 4 Drawing Figures

U.S. Patent  Oct. 23, 1979  4,171,593
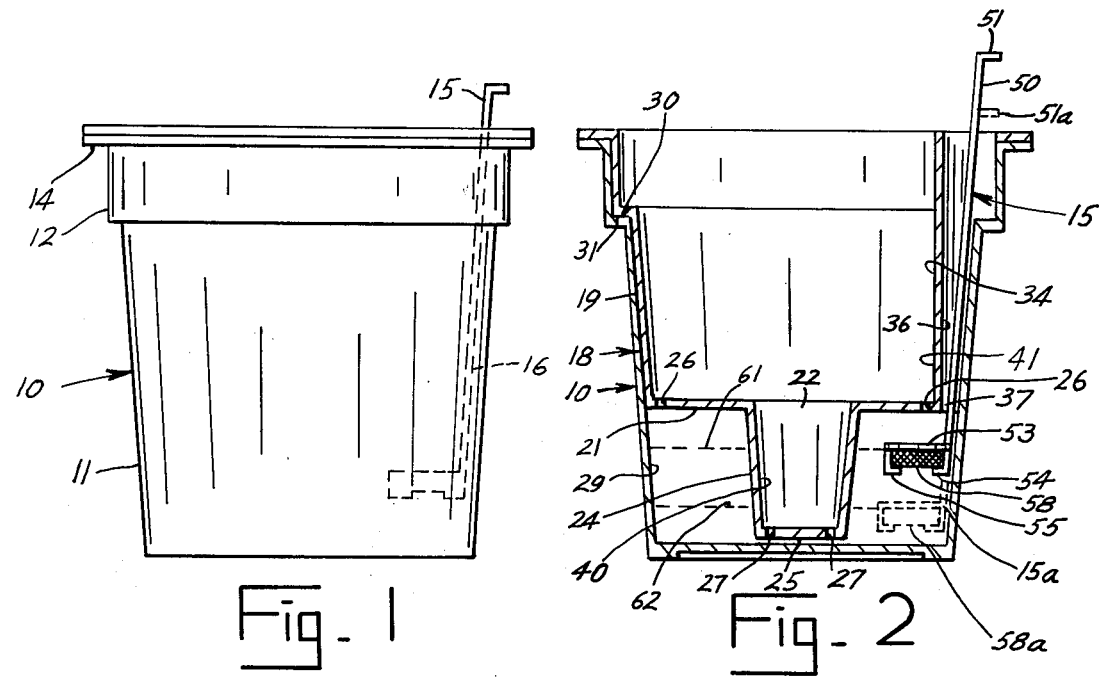
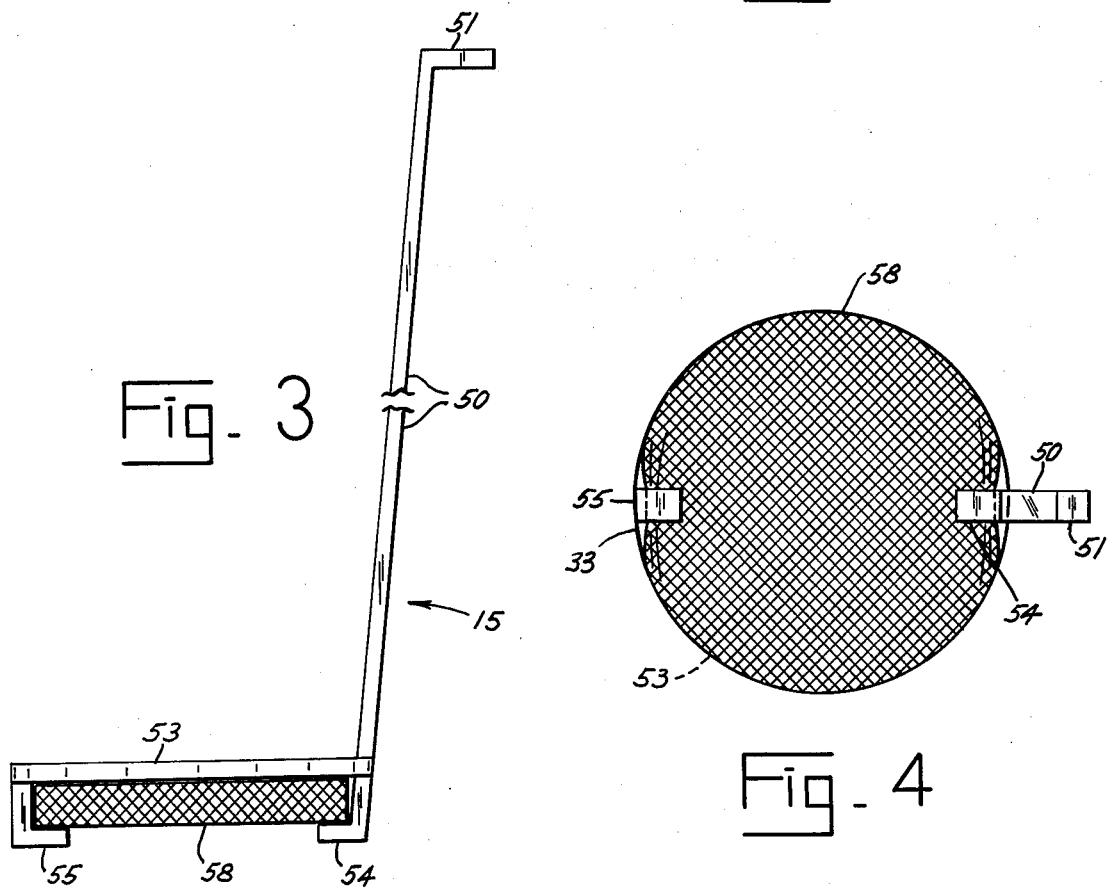

POT INCLUDING WATER LEVEL INDICATOR

BACKGROUND OF THE INVENTION

In pots for growing plants of the type described in application Ser. No. 812,344, filed July 1, 1977, a problem exists in the fact that the amount of water in the water reservoir in the pot cannot be determined without disassembly of the inner pot from within the outer pot. In the use of such pots, it is important that at least some water be present in the water reservoir at all times, as otherwise the plant or plants growing in the pot will not be adequately continuously watered. For example, if the directions for supplying water to the reservoir of the pot should call for addition of water once a month, and if the plant and environmental conditions cause use of all of the water in the reservoir before a month has elapsed, there will be a period at the end of each monthly period during which the plant is not watered as contemplated by use of the pots. While experimental data may, within certain bounds of accuracy, indicate that watering for a certain plant at given intervals will be adequate, there are variations in different locations as to relative humidity, and the like, and there are differences in the natures of different plants, so that such experimental data is not sufficiently accurate for proper and adequate use of the pots. This invention is designed to solve this problem in connection with the use of the pots.

SUMMARY OF THE INVENTION

This invention provides, for pots of the type described in application Ser. No. 812,344, filed July 1, 1977, and being equally useful in connection with other pots wherein a water reservoir is provided, a float device for use with such pots which will reliably and accurately indicate at all times the level of water remaining in the water reservoir. The water reservoir in the pots in said application consists of an annular space surrounding a reduced lower portion of an inner pot which is seated or nested within an outer pot. A water inlet passageway is provided between the outer and inner pots in a generally vertical but somewhat angular direction above the water reservoir. According to this invention, a float device is disposed within the water reservoir and has a stem which extends upwardly through the water inlet passageway to culminate upwardly at an outturned stem portion which, by its level above the upper end of the pot, indicates the amount of water in the water reservoir.

In order to function completely effectively, the water level indicator apparatus must be sufficiently light in weight that the float device, which is of limited size, does not float below the upper surface of the level of water, but instead floats accurately at the level of the water. The float must be of such a nature that it may be disposed in water indefinitely without becoming waterlogged and without being subject to changes in its buoyancy, and the stem must be such as to slide without significant frictional drag through the water inlet passageway in order that the float may constantly indicate the actual level of the water in the water reservoir.

A principal object of the invention is to provide a self-watering pot having a water level indicator. Another object of the invention is to provide such a pot wherein the water level indicator is accurate. A further object of the invention is to provide such a pot wherein the water level indicator is not subject to frictional drag which would affect its accuracy. Yet another object of the invention is to provide such a pot having a water level indicator which is of low cost and simple to manufacture. A further object of the invention is to provide such a pot having a water level indicator wherein the water level indicator may be replaced and may be added to existing pots having no water level indicator.

Other objects and advantages of the invention will appear from the following detailed description of a preferred embodiment thereof, reference being made to the accompanying drawings.

BRIEF DESCRIPTIONS OF THE DRAWINGS

FIG. 1 is a side elevation of a pot for growing plants having a water level indicator, of preferred form according to the invention.

FIG. 2 is a vertical cross section showing the pot and water level indicator of FIG. 1.

FIG. 3 is an enlarged side elevation of the water level indicator shown in FIGS. 1 and 2.

FIG. 4 is a bottom elevation of the water elevation indicator shown in FIG. 3.

DESCRIPTION OF THE PREFERRED EMBODIMENT

Describing now the preferred embodiment of apparatus shown in the drawings, and referring first to FIG. 1 of the drawings, the self watering pot having a water level indicator includes an outer pot 10 having tapered sides 11 and having an enlarged upper portion 12. A flange 14 is provided around the upper periphery of portion 12. A water level indicator 15 is indicated by dashed lines at its lower portion 16.

Referring now also to FIGS. 2–4 of the drawings, outer pot 10 has disposed therein an inner pot 18 having tapered sides at 19 adapted to closely fit within the upper portion of the lower tapered portion 11 of outer pot 10. Pot 18 has an upper level bottom 21 having an opening 22 concentrically thereof beneath which extends a well formation 24 having a lower level bottom 25. Bottom 21 has a plurality of passages 26 therethrough circularly spaced adjacent its edge, and bottom 25 has a plurality of passages 27 therethrough through which water may rise from the reservour space 29 provided in the lower portion of outer pot 10.

The outer pot has an upwardly facing interior annular shoulder 30 upon which is seated a downwardly facing exterior annular shoulder 31 of inner pot 18, shoulder 31 extending somewhat less than the full periphery of pot 18. The inner pot 18 has a vertical U-shaped wall 34 which projects inwardly from its periphery over a small extent thereof to provide a passageway to the reservoir 29 from the upper exterior of the pot assembly. Water may be introduced into reservoir space 29 through the resulting passageway 36 formed by U-shaped wall 34. Passageway 36 also provides for air entrance into the reservoir space 29, the seating of shoulder 30 against shoulder 31 forming a fairly airtight seal between the inner pot 18 and the outer pot 10 around the remainder of the periphery except at passageway 36. This seal is necessary in order that excessive evaporation of water from reservoir 29 will not occur. The lower end 37 of passageway 36 is of fairly restricted dimensions so that only a limited amount of water evaporation therethrough will occur.

Further details concerning the pot structure may be obtained by examination of application Ser. No. 812,344, filed July 1, 1977.

When the pot is in use, the space 40 within well 24 is filled with a surface active material such as subdivided perlite, or the like, which by its capillary action causes rise of water through the well into the pot space 41 at the upper interior of inner pot 18. Space 41 is filled with soil in which one or more growing plants will be planted. Water rising through well space 40 will circulate up into the soil within space 41 to adequately maintain a properly watered condition of the soil so that the plant or plants will grow satisfactorily. Any excess water within space 41 may drain downwardly into the water reservoir 29 through the openings 26. The water, of course, rises into well space 40 through the openings 27.

The float device 15 includes a stem 50 which is shown to be outturned at 51 at its upper end. The upper end of the stem may have other configurations as desired, but the outturned form is useful since it enables lifting of the stem as may be required and is inexpensive to manufacture. At the lower end of stem 50, there is provided a horizontally disposed disc 53 integrally formed with the lower end of the stem, and which has two downwardly and inwardly formed lugs 54 and 55. Between the two lugs 54, 55 there is removably disposed a float pad 58 formed of a lightweight cellular material. The cellular structure of the float pad 58 is indicated by the outer surface cross-hatching shown thereon. The cellular material of float pad 58 has entrapped therein either air or another gas, or may have vacuum spaces. Sufficient cavity space is provided in float pad 58 that it is very buoyant and well able to support the weight of the remainder of float element 15 and yet float at or near the water level within reservoir 29.

The float element, in FIG. 2, is shown at an upper solid line position at an upper water level 61, and is also shown at a lower position at a lower water level 62, the latter showing being in dashed lines and being indicated by reference numeral 15a.

The float pad 58 is preferably of the same diameter as the disc 53. As indicated in FIG. 4 of the drawings, opposite edges of the pad 58 are forced inwardly against the inner sides of the lugs 54, 55, the lower horizontal portions of the lugs retaining the pad 58 in an upward direction. The pad 58 should be of sufficient rigidity that it will not sag at locations away from the lugs 54, 55. Any suitable foamed material may be used, including polyethylene, Bakelite, or any other suitable plastic, rubber, or rubber-like material. Preferably, the material should be somewhat elastomeric for easy installation between the lugs 54, 55, but fairly rigid materials may be used.

As should by now be obvious, the floating pad portion 58 of the level indicator floats adjacent the water level in reservoir 29. When the water level is at a higher level 61, the float pad 58 is in its upper solid line position (FIG. 2), moving stem 50 upwardly, and when the water level is at a lower level 62, the float pad 58 is at a lowered position 58a, the stem being lowered to a position 51a at its upper end. The float accurately follows the water level so that when the water level begins at an upper level, and gradually falls to a lower level, the float element 58 will follow the water level so that the stem at all times will accurately indicate the water level within reservoir 29.

It will be realized that the disc portion 53 and stem portion 50 of the apparatus must be relatively light in weight in order that the float pad 58 may accurately follow the water level. In addition, the stem 50 must be smooth and must have a substantially friction free characteristic with regard to the walls of passageway 36 so that the float apparatus will not hang in any position non-indicative of the accurate water level. As shown in the drawings, the stem 50 is of rectangular shape and has a smooth outer surface non-engageable with the passageway surfaces. The circular shape of disc 53 provides that the lower portion of the float apparatus will not rotate significantly with respect to the pot and will remain in the position shown with a longer flat side of the rectangular configuration of stem 50 against the outer pot wall. The stem 50 should also be straight or nearly straight in order that no hanging up characteristic will result from its shape.

While a preferred embodiment of the apparatus according to the invention has been shown and described, many modifications thereof may be made by persons skilled in the art without departing from the spirit of the invention, and it is intended to protect by Letters Patent all forms of the invention falling within the scope of the following claims.

I claim:

1. Pot for growing plants, comprising a pot having a water reservoir in a portion thereof below its upper end, said pot having a generally vertical water inlet passageway extending from an upper portion of said pot to said water reservoir, float means disposed in said water reservoir having stem means extending upwardly through said water inlet passageway to an upper end above the upper end of said water inlet passageway, said float means having a buoyancy whereby it floats at the surface of water within said water reservoir, the position of said upper end of said stem means extending above said upper end of said pot and continuously indicating the level of water in said water reservoir, said float means comprising a generally horizontal circular plate affixed at a side thereof to the lower end of said stem means, said plate having downwardly extending oppositely disposed lugs at opposite sides thereof each having an inturned lower end portion, and a flat circular buoyant float pad of the same diameter as said plate resiliently engaged beneath said plate between said lugs above said inturned lower end portions thereof.

2. The combination of claim 1, said buoyant float pad being formed of resilient cellular plastic material capable of being compressed to be disposed and removed from between said lugs.

3. The combination of claim 2, said stem being uniform and smooth over its length whereby it will readily slide through said water inlet passageway in response to changes in the water level within said water reservoir.

4. The combination of claim 1, said pot comprising an outer pot and an inner pot nested within said outer pot, said water reservoir being formed by a bottom portion of said outer pot, said water inlet passageway being formed at one side of said pot between upper portions of the walls of said outer and inner pots.

* * * * *